(12) United States Patent
Bariska, Jr. et al.

(10) Patent No.: US 8,661,296 B2
(45) Date of Patent: Feb. 25, 2014

(54) DYNAMIC DATA STORE FOR FAILED JOBS IN A SYSTEMS COMPLEX

(75) Inventors: Arthur J. Bariska, Jr., Tucson, AZ (US); Marc A. Martin, Tucson, AZ (US); Thaiese N. Trader, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 13/017,956

(22) Filed: Jan. 31, 2011

(65) Prior Publication Data

US 2012/0198285 A1    Aug. 2, 2012

(51) Int. Cl.
 *G06F 11/00* (2006.01)
(52) U.S. Cl.
 USPC ............................................................ 714/45
(58) Field of Classification Search
 None
 See application file for complete search history.

(56) References Cited

U.S. PATENT DOCUMENTS

| 5,872,970 | A | 2/1999 | Pickett et al. | |
| 6,289,368 | B1 | 9/2001 | Dentler et al. | |
| 7,058,666 | B1 | 6/2006 | Li et al. | |
| 7,320,125 | B2* | 1/2008 | Elliott et al. | 717/131 |
| 7,493,525 | B2* | 2/2009 | Wigley et al. | 714/45 |
| 7,962,803 | B2* | 6/2011 | Huber et al. | 714/45 |
| 8,438,424 | B2* | 5/2013 | Elliott et al. | 714/38.1 |
| 2007/0226544 | A1* | 9/2007 | Woodhouse | 714/45 |
| 2008/0307267 | A1* | 12/2008 | Chandrasekaran | 714/38 |
| 2009/0132703 | A1* | 5/2009 | Fellenstein et al. | 709/224 |
| 2010/0083052 | A1* | 4/2010 | Huber et al. | 714/45 |
| 2011/0113117 | A1* | 5/2011 | Genest et al. | 709/217 |

FOREIGN PATENT DOCUMENTS

JP    2006/277696 A2    10/2006

* cited by examiner

*Primary Examiner* — Christopher McCarthy
(74) *Attorney, Agent, or Firm* — Zilka-Kotab, PC

(57) ABSTRACT

In one embodiment, a computer program product for first time data capture includes a computer readable storage medium having computer readable program code embodied therewith. The computer readable program code is configured to run jobs on a systems complex (sysplex), to trace the jobs running on the sysplex, to monitor each of the jobs running on the sysplex for an unexpected action by any of the jobs, and to store information relating to each unexpected action performed by any of the jobs into an entry of a data store. In another embodiment, a method includes running jobs on a sysplex, tracing the jobs running on the sysplex, monitoring each of the jobs running on the sysplex for an unexpected action by any of the jobs, and storing information relating to each unexpected action performed by any of the jobs into an entry of a data store.

20 Claims, 3 Drawing Sheets

DYNAMIC DATA STORE FOR FAILED JOBS IN A SYSTEMS COMPLEX

BACKGROUND

Many large scale systems run multiple workloads over the course of any given day. These systems may be referred to as a systems complex (sysplex), which may include multiple systems, each of the multiple systems having its own complexities and infrastructure. These workloads typically run many jobs which may end abnormally due to any number of varied and often uncontrollable ways. It is an arduous job to collate all the jobs that failed across a systems complex (sysplex). There are some methods which are currently used to gather all the jobs that failed across a sysplex, but there are drawbacks to these methods, including the length of time needed to execute these methods.

Therefore, what is needed is a method in which the jobs that failed across a sysplex can be aggregated more efficiently than current methods allow.

BRIEF SUMMARY

In one embodiment, a computer program product for first time data capture includes a computer readable storage medium having computer readable program code embodied therewith. The computer readable program code includes computer readable program code configured to run one or more jobs on a systems complex (sysplex), to trace the one or more jobs running on the sysplex, to monitor each of the one or more jobs running on the sysplex for an unexpected action by any of the jobs, and to store information relating to each unexpected action performed by any of the jobs into an entry of a data store.

In another embodiment, a method includes running one or more jobs on a systems complex (sysplex), tracing the one or more jobs running on the sysplex, monitoring each of the one or more jobs running on the sysplex for an unexpected action by any of the jobs, and storing information relating to each unexpected action performed by any of the jobs into an entry of a data store.

Other aspects and embodiments of the present invention will become apparent from the following detailed description, which, when taken in conjunction with the drawings, illustrate by way of example the principles of the invention.

DETAILED DESCRIPTION

Figure 1:
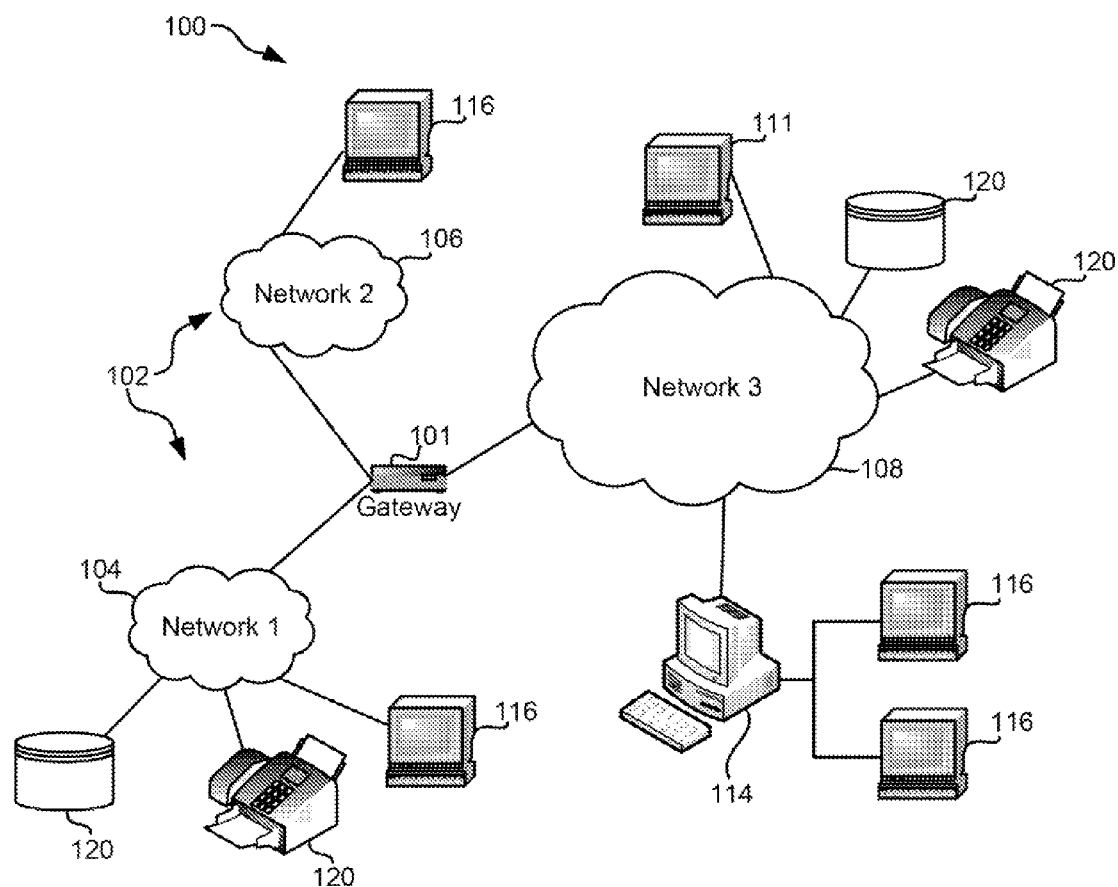
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses collating failed jobs in a real-time systems complex (sysplex). According to one embodiment, an address space of a module running on a sysplex may be used to store a jobs relevant logical stack trace and to collate the jobs into a dynamic data store. The dynamic data store may be a database, a table, a list, a linked array, etc., and may be stored in the sysplex.

In one general embodiment, a computer program product for first time data capture includes a computer readable storage medium having computer readable program code embodied therewith. The computer readable program code includes computer readable program code configured to run one or more jobs on a sysplex, to trace the one or more jobs running on the sysplex, to monitor each of the one or more jobs running on the sysplex for an unexpected action by any of the jobs, and to store information relating to each unexpected action performed by any of the jobs into an entry of a data store.

In another general embodiment, a method includes running one or more jobs on a sysplex, tracing the one or more jobs running on the sysplex, monitoring each of the one or more jobs running on the sysplex for an unexpected action by any of the jobs, and storing information relating to each unexpected action performed by any of the jobs into an entry of a data store.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic", a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
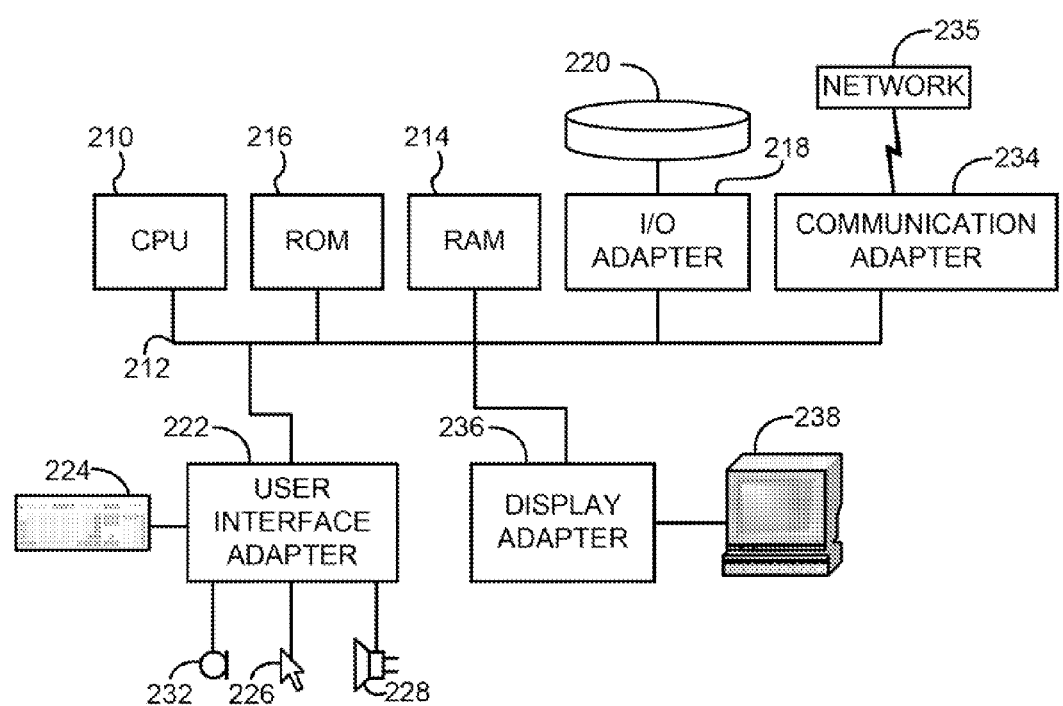
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, IBM z/OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

According to one embodiment, an address space of a module running on a system may be used to store a jobs relevant logical stack trace and to collate the jobs into a dynamic data store. The data store may be a table, a list, an array, a linked array, a database, or any other data store as would be understood by one of skill upon reading the present descriptions. For the sake of simplicity, the data store will be referred to as table for the remainder of the descriptions herein.

The table may be used for later processing of the failed jobs, in some approaches. The table may be stored in a non-volatile memory of the system, or in some other memory, as would be known to one of skill in the art. The table may be retrieved at any time by the system, by a user, by an administrator, etc. Parsing the dynamic table is possible and may be advantageous because it allows the output and dump of the job to be stored in the table and the table may include all relevant information, such as the system the job was running on when it failed, the timestamp of the failure, etc. Certain key areas may be focused on and aggregated, especially in the case of abnormal program ends (ABENDs). There are many advantages to using the methods, systems, and computer program products described herein, including the ease of use, the ability to run completely internally all functionality without the need for any user input, a trace of job flow along with ABEND, which sysplex and/or workload is more problematic, etc.

In one approach, a dynamic table is used to store information regarding failed jobs. Inputting the jobs that failed into the table on the system in a dynamic fashion along with relevant information may allow for easy dispatch and integration into a database or front-end for the system administrator to use, such as for troubleshooting, optimization, etc.

Figure 3:
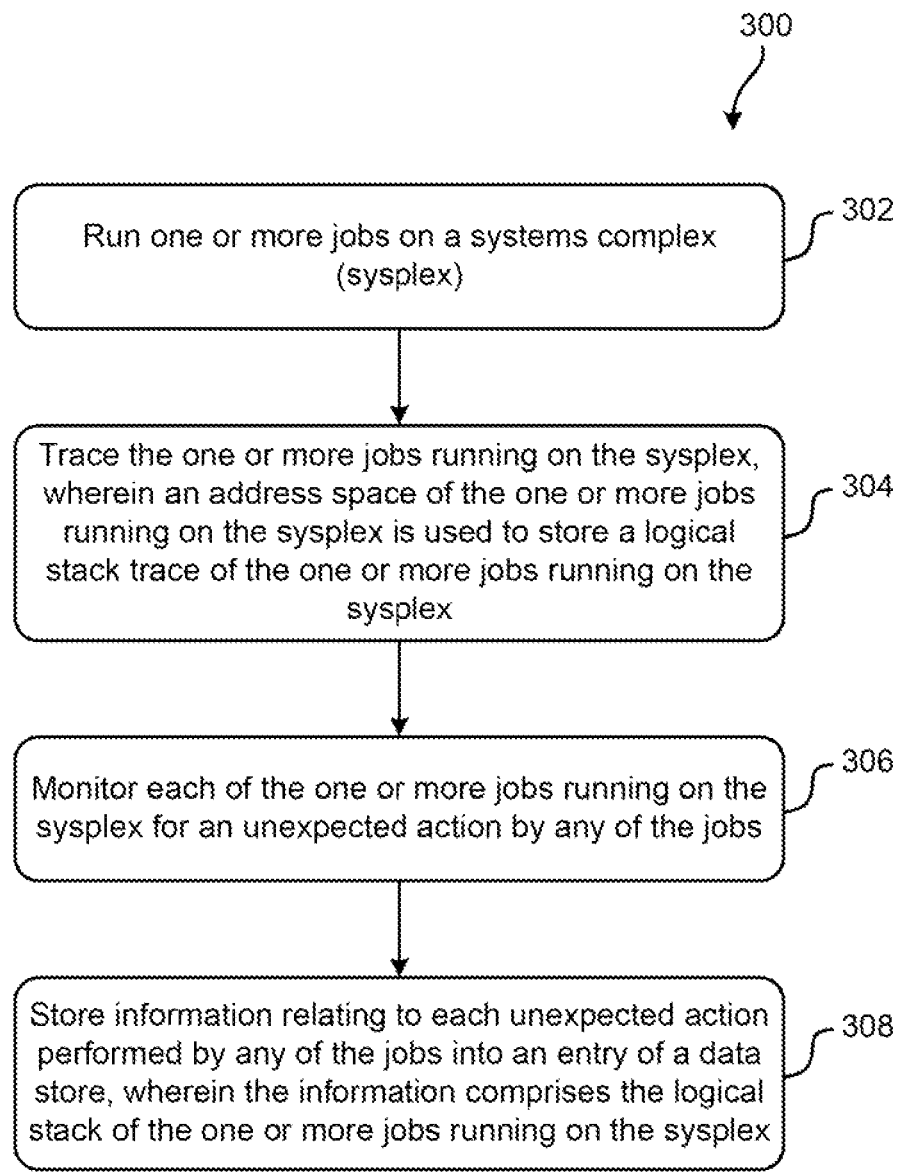
FIG. 3 shows a flowchart of a method in accordance with one embodiment.

Now referring to FIG. 3, a method 300 is shown according to one embodiment. The method 300 may be carried out in any desired environment, including those described in FIGS. 1-2, among others. Of course, more or less operations than those described below may comprise the method 300, according to various embodiments.

In operation 302, one or more jobs is run or executed on a systems complex (sysplex). The sysplex may be of any type known in the art, according to various embodiments. In some approaches, the jobs may include one or more tasks that the job is attempting to execute.

In operation 304, the one or more jobs running on the sysplex are traced, wherein an address space of the one or more jobs running on the sysplex is used to store a logical stack trace of the one or more jobs running on the sysplex. The tracing may be accomplished using hooks in the program using branch tracing along with a central program with dynamically allocated pointers that hold the jobs running on the system, in one approach.

In one approach, the tracing may include tracing one or more code_access events for each job running on the sysplex, and tracing one or more code_branch events for each job running on the sysplex.

In another approach, the tracing may include a logical tracing algorithm. In specific approaches, the logical tracing algorithm may be stored in an operating system of the sysplex.

In operation 306, each of the one or more jobs running on the sysplex is monitored for an unexpected action by any of the jobs. One such unexpected action is an abnormal job end (ABEND), according to one embodiment. Of course, other program failures may occur other than an ABEND which would also draw attention from the tracing routine, according to some approaches.

In some examples, a program that is running may be part of a larger grouping of applications or programs which comes to an end, and the program or the group of programs may perform some error routines to attempt some form of diagnostics. However, in most cases, the program would need to be restarted if it failed, or some task that the program is performing may need to be restarted. However, in some cases, the program may continue to function, albeit in some reduced fashion, and the table may still be used to log information related to the suspect program. In some embodiments, automated corrective action may be taken within the program, and in alternative embodiments, human intervention to take corrective action may be used, and in even more embodiments, both may take place. These corrective actions may be in addition to the use of the table for information logging purposes, in some approaches. In short, if a program fails or a task the program was trying to perform fails, the methods, systems, and/or computer program products described herein may be used to log information into a table for future purposes.

In operation 308, information relating to each unexpected action performed by any of the jobs is stored into an entry of a data store, wherein the information comprises the logical stack of the one or more jobs running on the sysplex. In some embodiments, only relevant information is stored. Relevant information may include any information associated with the failed job that may be used to diagnose what caused the job to fail. For example, relevant information about the failed job may include each of any other interactions that were ongoing at the time that the job failed (since sometimes one of the other jobs or other pieces of storage information that is being accessed may have actually been the cause of the failure). Knowing which interactions were ongoing allows a broader picture of the system to be formed, and in many cases, when a job ABENDs, it may have actually ABENDed due to another job or interaction that occurred in some other processing in the sysplex.

The data store may be of any type, such as a table, an array, a list, a database, etc., or any other data store as would be known by one of skill in the art.

In one embodiment, the data store (table) may include job_termination_status information for each entry. In another embodiment, the data store (table) may include trace_data information for each entry, the trace_data information comprising at least one code_access event and at least one code_branch event, in one approach.

In some embodiments, the method 300 may include creating the data store (table) having one or more entries in response to the unexpected action and/or storing the data store (table).

The table may be stored when the job ABENDs or when some other trigger occurs, as would be understood by one of skill in the art upon reading the present descriptions. In some embodiments, a user may enter one or more triggers as a critical detection threshold which triggers storing of the failed job and other relevant information.

For example, all the jobs that failed, e.g., during a certain time period, during execution of a process, while the table is active, etc., are going to be stored into the table. Tracing algorithms as known in the art may be used to trace through the executing code and then when an ABEND occurs, the logical trace is stored into the table. Therefore, the table includes failed jobs and the traces resulting from the failed jobs being traced.

According to one embodiment, the dynamic table may be stored internally on the system, and may store relevant information to the job using tracing and taking snapshots of when the program branches into control sections (CSECTs). The table may be indexed using unique keys and may store the jobs according to job name and system information along with a timestamp.

In another embodiment, the method 300 may include sending the data store (table) to a system administrator for diagnosing a problem with the sysplex, or to any other entity as would be understood by one of skill in the art upon reading the present descriptions.

The table may be logged for future purposes, in one approach. This provides a quick and easy way to handle, search, diagnose, and correct failed jobs.

Of course, this logic may be implemented as a method on any device and/or system or as a computer program product, according to various embodiments.

In one such embodiment, a computer program product for first time data capture includes a computer readable storage medium having computer readable program code embodied therewith. The computer readable program code comprises computer readable program code configured to run one or more jobs on a sysplex, computer readable program code configured to trace the one or more jobs running on the sysplex, wherein an address space of the one or more jobs running on the sysplex is used to store a logical stack trace of the one or more jobs running on the sysplex, computer readable program code configured to monitor each of the one or more jobs running on the sysplex for an unexpected action by any of the jobs, and computer readable program code configured to store information relating to each unexpected action performed by any of the jobs into an entry of a data store, wherein the information comprises the logical stack of the one or more jobs running on the sysplex.

Of course, any of the embodiments and/or approaches previously described relating to the method 300 may apply to the computer program product, according to various embodiments.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for first time data capture, the computer program product comprising a computer readable storage medium having computer readable program code embodied therewith, the computer readable program code comprising:
   computer readable program code configured to run one or more jobs on a systems complex (sysplex);
   computer readable program code configured to trace the one or more jobs running on the sysplex, wherein an address space of the one or more jobs running on the sysplex is used to store a logical stack trace of the one or more jobs running on the sysplex;
   computer readable program code configured to monitor each of the one or more jobs running on the sysplex for an unexpected action by any of the jobs; and
   computer readable program code configured to store information relating to each unexpected action performed by any of the jobs into an entry of a data store, wherein the information comprises the logical stack of the one or more jobs running on the sysplex,
   wherein the data store includes trace_data information for each entry.

2. The computer program product of claim 1, further comprising computer readable program code configured to create the data store having one or more entries in response to the unexpected action.

3. The computer program product of claim 1, further comprising computer readable program code configured to store the data store to a nonvolatile memory.

4. The computer program product of claim 1, further comprising computer readable program code configured to send the data store to a system administrator for diagnosing a problem with the sysplex.

5. The computer program product of claim 1, wherein the computer readable program code configured to trace comprises:
   computer readable program code configured to trace one or more code_access events for each job running on the sysplex; and
   computer readable program code configured to trace one or more code_branch events for each job running on the sysplex.

6. The computer program product of claim 1, wherein the computer readable program code configured to trace comprises a logical tracing algorithm.

7. The computer program product of claim 6, wherein the logical tracing algorithm is stored in an operating system of the sysplex.

8. The computer program product of claim 1, wherein the data store includes job_termination_status information for each entry.

9. The computer program product of claim 1, wherein the trace_data information for each entry comprises at least one code_access event and at least one code_branch event.

10. The computer program product of claim 1, wherein the data store is chosen from a group consisting of: a table, an array, a list, and a database.

11. A method, comprising:
running one or more jobs on a systems complex (sysplex);
tracing the one or more jobs running on the sysplex, wherein an address space of the one or more jobs running on the sysplex is used to store a logical stack trace of the one or more jobs running on the sysplex;
monitoring each of the one or more jobs running on the sysplex for an unexpected action by any of the jobs; and
storing information relating to each unexpected action performed by any of the jobs into an entry of a data store, wherein the information comprises the logical stack of the one or more jobs running on the sysplex,
wherein the data store includes job_termination_status information for each entry.

12. The method as recited in claim 11, further comprising:
creating the data store having one or more entries in response to the unexpected action; and
storing the data store to a nonvolatile memory.

13. The method as recited in claim 11, further comprising sending the data store to a system administrator for diagnosing a problem with the sysplex.

14. The method as recited in claim 11, wherein the tracing comprises:
tracing one or more code_access events for each job running on the sysplex; and
tracing one or more code_branch events for each job running on the sysplex.

15. The method as recited in claim 11, wherein the tracing comprises a logical tracing algorithm.

16. The method as recited in claim 15, wherein the logical algorithm is stored in an operating system of the sysplex.

17. The method as recited in claim 11, further comprising indexing the data store using one or more unique keys.

18. The method as recited in claim 11, wherein the data store includes trace_data information for each entry, the trace_data information comprising at least one code_access event and at least one code_branch event.

19. The method as recited in claim 11, wherein the data store is chosen from a group consisting of: a table, an array, a list, and a database.

20. A computer program product for first time data capture, the computer program product comprising a computer readable storage medium having computer readable program code embodied therewith, the computer readable program code comprising:
computer readable program code configured to run one or more jobs on a systems complex (sysplex);
computer readable program code configured to trace the one or more jobs running on the sysplex, wherein an address space of the one or more jobs running on the sysplex is used to store a logical stack trace of the one or more jobs running on the sysplex;
computer readable program code configured to monitor each of the one or more jobs running on the sysplex for an unexpected action by any of the jobs; and
computer readable program code configured to store information relating to each unexpected action performed by any of the jobs into an entry of a data store,
wherein the information comprises the logical stack of the one or more jobs running on the sysplex, and
wherein the data store is chosen from a group consisting of a table, an array, a list, and a database.

* * * * *